United States Patent [19]

Covington et al.

[11] Patent Number: 4,922,695

[45] Date of Patent: May 8, 1990

[54] MULTI-ROW COTTON HARVESTER

[75] Inventors: Michael J. Covington, LaGrange; Jesse H. Orsborn, Hinsdale, both of Ill.

[73] Assignee: J. I. Case Company, Racine, Wis.

[21] Appl. No.: 280,372

[22] Filed: Dec. 6, 1988

[51] Int. Cl.$^5$ ............................................. A01D 46/14
[52] U.S. Cl. ............................................. 56/40; 56/44
[58] Field of Search ...................... 56/40, 41, 28, 13.2, 56/13.5, 15.5, 44

[56] References Cited

U.S. PATENT DOCUMENTS

| Re. 2,699 | 6/1988 | Fachini | 56/41 |
|---|---|---|---|
| 4,249,365 | 2/1981 | Hubbard et al. | 56/13.2 |
| 4,538,403 | 9/1985 | Fachini | 56/41 |
| 4,722,173 | 2/1988 | Covington et al. | 56/28 |
| 4,803,830 | 2/1989 | Junge et al. | |
| 4,817,370 | 4/1989 | Deutsch et al. | 56/41 |

FOREIGN PATENT DOCUMENTS

231942  8/1969  U.S.S.R. ................................. 56/40

Primary Examiner—Jerome W. Massie
Assistant Examiner—Gay Ann Spahn
Attorney, Agent, or Firm—Dressler, Goldsmith, Shore, Sutker & Milnamow Ltd.

[57] ABSTRACT

A multi-row cotton harvester machine having a plurality of harvesting units and a system for individually mounting the harvesting units at a front end of the cotton harvester. The mounting system includes a tool bar which is adapted for vertical movement with respect to the frame of the harvesting machine. The harvesting units are individually connected to the tool bar in a manner allowing the harvesting units to be readily moved relative to each other between a first position wherein the units are arranged to effect narrow row cotton harvesting and a second position wherein the harvesting units are further spaced apart to provide access for servicing or to effect wider row cotton harvesting operations.

16 Claims, 7 Drawing Sheets

MULTI-ROW COTTON HARVESTER

FIELD OF THE INVENTION

This invention generally relates to multi-row cotton harvesting machines and, more particularly, to a system for mounting and supporting at least one pair of individual harvesting units on a frame of a cotton harvesting machine for displacement relative to each other.

BACKGROUND OF THE INVENTION

For many years, rows of cotton were spaced at least thirty-eight to forty inches apart. Recently, however, farmers have noted a substantial increase in productivity when the cotton rows are spaced closer together; i.e. about thirty inches apart. Besides an increase in cotton productivity, narrower spacing between rows allows uniformity between seed planting operations. For these and other reasons, there is an incentive to plant cotton in narrow rows.

Conventional self propelled cotton harvesters utilize individual harvesting units mounted at a front end of the cotton harvester. Each harvesting unit typically includes two picker rotors comprised of numerous circularly driven picker bars. Each picker bar mounts a plurality of rotatably driven, radially extending picker spindles for removing the cotton from the plant.

A pair of doffer assemblies along with a picker spindle moistening assembly are typically provided in combination with the harvesting unit. Each doffer assembly, having numerous doffer pads, is provided to remove the cotton from the individual picker spindles. The picker spindle moistening assembly includes a series of vertically arranged moistening pads for adding moistening fluid to each of the cotton picker spindles before they are introduced to the cotton plants.

Although considerable design effort has resulted in cotton harvesting units of reduced size and weight, the usage and required operation of such units dictates a relatively large size mechanism having considerable weight. Because of their structure, arranging the individual harvesting units on a cotton harvester for picking narrow rows of cotton has been a continuing source of difficulty.

Cotton picker machines having up to four individual harvesting units arranged in side-by-side relationship relative to each other have been designed to increase cotton picker production. To allow for picking of adjacent, narrowly spaced rows of cotton it is known to arrange the picker rotors of one harvesting unit such that they tranversely overlap or nest relative to the picker rotors of an adjacent picker unit.

Complete servicing of the harvesting units which are so arranged is difficult and time consuming because of the limited accessability between units. To remove an inboard harvesting unit for servicing usually requires removal of the adjacent outboard harvesting unit. Simultaneous removal of both harvesting units causes problems due to the bulkiness and weight of the separate harvesting units. Moreover, removal of the outboard harvesting unit before the removal of the inboard harvesting unit takes additional time, a premium during the harvest season.

SUMMARY OF THE INVENTION

In view of the above, and in accordance with the present invention, there is provided a multi-row cotton harvester having at least one pair of individually mounted harvesting units. The harvesting units are connected to a frame of the harvesting machine in such a manner as to allow the harvesting units to be readily moved between first and second positions and relative to each other. In one position, the harvesting units are arranged relative to each other to facilitate picking of narrower rows of cotton. In their other position, the harvesting units are more widely spaced from one another to allow for either picking wider rows of cotton or to permit servicing of the individual harvesting units without requiring complete removal of either unit from the machine.

More specifically, the harvesting machine of the present invention includes a main frame which is supported by a pair of wheeled axles. A pair of individual harvesting units are supported at a forward end of the main frame in an adjacent or side-by-side relationship relative to each other. Each harvesting unit defines a fore-and-aft plant passage and includes a first picker rotor with a rotational axis and a second picker rotor with a rotational axis. Preferably, the axes of the first and second picker rotors are arranged on opposite sides of the plant passage.

The cotton picker harvesting units are preferably mounted in aligned side-by-side order on an elongated tool bar which is connected to the frame of the machine. The harvesting units are individually connected to the tool bar in a manner permitting displacement or movement of at least one harvesting unit between first and second positions. A driver mechanism, which may be controlled by the operator, displaces each movable harvesting unit between its first and second positions.

A pair of lift arms pivotally attach the tool bar, with the harvesting units mounted thereon, to the main frame of the machine. To control the vertical disposition of the harvesting units relative to the frame, a distendable hydraulic cylinder is pivotally connected between the vehicle frame and each lift arm. The operative length of the hydraulic cylinder controls the angular displacement of the lift arms and thereby the vertical disposition of the harvester units relative to the frame of the machine.

The present invention is advantageous over other cotton harvesting systems by providing a mechanism for connecting the harvesting units to the frame such that one or more harvesting units can be readily moved relative to each other to provide more or less spacing therebetween. In a preferred form of the invention, the tool bar defines a guide track which extends away from each lift arm in generally orthogonal directions. Each harvesting unit includes a sliding support structure with bearings for permitting the harvesting unit to roll along the guide track of the tool bar for linear distention between first and second positions.

To facilitate an increase in cotton picking production, a second or outer pair of harvesting units may be further connected to the tool bar forwardly of the main frame in side-by-side relation with the other pair of harvesting units. Each harvesting unit of the second pair of harvesting units is individually connected to the tool bar in a manner allowing displacement thereof between first and second positions. The driver mechanism is connected to each of the second pair of harvesting units to move them between first and second positions.

Each harvesting unit of the second pair of harvesting units preferably includes a sliding support structure for allowing those harvesting units to be moved between first and second positions. As currently designed, each sliding support structure of the second pair of harvesting units includes a generally horizontal cantilevered arm telescopically received and supported by an adjacent sliding support structure of the other pair of harvesting units.

In line with the present invention, the driver mechanism for moving the harvesting units includes two drivers extending in opposite axial directions. Each driver includes a linear distendable ram or member which is connected between the tool bar and the each harvesting unit it displaces. In those embodiments wherein a second pair of harvesting units are arranged on the tool bar, the each distendable ram has at least one stop arranged in combination therewith for setting the relative position for the harvesting units.

A mounting system according to the present invention readily facilitates mounting of a plurality of harvesting units to a forward end of the harvesting machine and provides for relatively narrow spacing between the harvesting units. While the harvesting units of the cotton harvester may be designed such that the picker rotors of one harvesting unit are allowed to transversely overlap or nest relative to the picker rotors of another harvesting unit, the structure of the present invention permits the harvesting units to be readily moved with respect to each other to allow for servicing or wider cotton row spacing therebetween.

Other features and advantages of the present invention will become readily apparent from the following detailed description, appended drawings, and accompanying claims.

DETAILED DESCRIPTION OF THE PRESENT INVENTION

While the present invention is susceptible of embodiment in various forms, there is shown in the drawings a preferred embodiment hereinafter described with the understanding that the present disclosure is to be considered as an exemplification of the invention, and is not intended to limit the invention to the specific embodiment illustrated.

Figure 1:
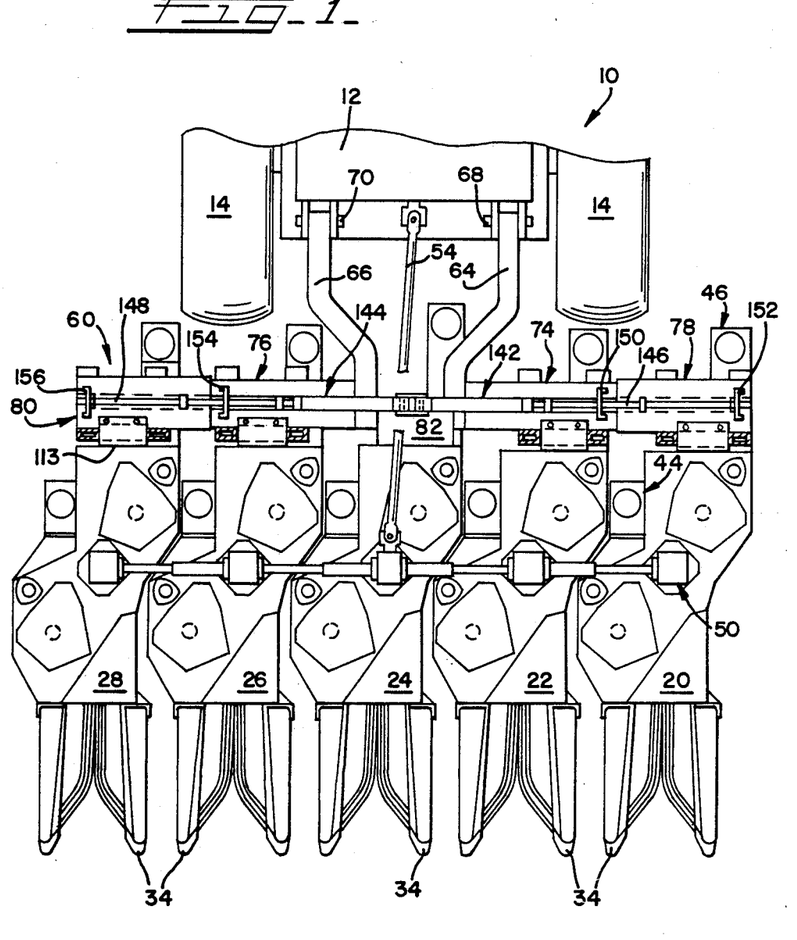
FIG. 1 is a partial top plan view of a cotton harvester illustrating a harvesting unit configuration for harvesting narrow row cotton.

Referring now to FIG. 1, there is shown a self-propelled cotton harvesting machine which is depicted only fragamentarily and is seen as represented in its entirety by reference numeral 10. Cotton harvesting machine 10 has a mobile main frame 12 mounted on a pair of ground engaging front wheels 14. A pair of steerable rear wheels (not shown) provide the harvester with proper direction.

Positioned forwardly on the frame 12 are a plurality of individual cotton picker harvesting units 20, 22, 24, 26 and 28. As illustrated, the harvesting units are arranged in a side-by-side relationship for harvesting parallel rows of cotton. It should be appreciated, however, that this invention equally applies to a lesser number of harvesting units than that illustrated.

In a preferred form of the invention, each of the harvesting units is substantially similar in structure. Accordingly, only a description of harvesting unit 20 will be provided with the understanding that the other harvesting units are similarly structured.

Figures 2, 3:
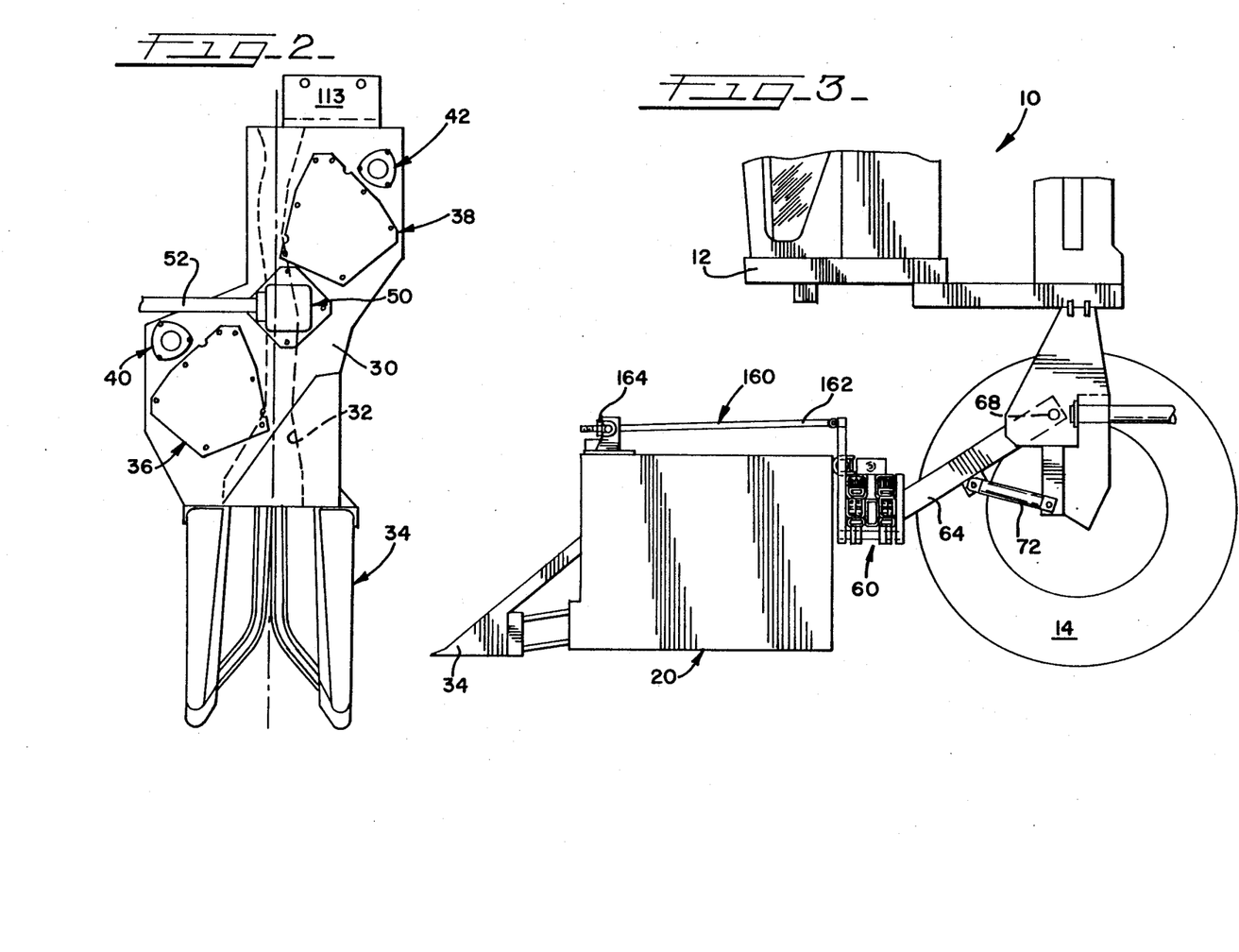
FIG. 2 is a top plan view showing the general configuration of a single harvesting unit.
FIG. 3 is a partial side elevational view illustrating a harvesting unit mounting system according to the present invention.

Turning to FIG. 2, each harvesting unit includes a housing assembly 30 defining a fore-and-aft crop-receiving opening or passage 32. Each harvesting unit is further provided with a pair of stalk lifters 34 on either side of opening 32.

As illustrated in FIG. 2, each harvesting unit includes front and rear spindle rotors 36 and 38 which, in a preferred embodiment, are transversely separated by the fore-and-aft plant passage 32. Adjacent the spindle rotors 36 and 38 are conventional upright doffer assemblies 40 and 42 which remove cotton from picking spindles on the spindle rotors 36 and 38. Conventional upright discharge assemblies 44 and 46 (FIG. 1) are provided near the doffer assemblies 40 and 42, respectively. The discharge assemblies receive cotton bolls removed from the spindle rotors 36 and 38 by the doffers 40 and 42 and direct same through upright openings in the rear of the units. Cotton conveying ducts (not shown) direct the cotton from the discharge assemblies into a basket (not shown) on the machine.

The spindle rotors 36 and 38 and the doffer assemblies 40 and 42 are driven by a conventional drive assembly. As illustrated, such a drive assembly includes a bevel gear transmission mounted in a gear housing 50 preferably arranged at an upper end of each housing assembly 30. Telescopic drive shafts 52 transmit torque and power from an input drive shaft 54 to adjacent harvesting units and permit lateral displacement of the harvesting units with respect to each other without loss of power.

A support assembly, indicated generally at 60 in FIG. 1, is provided for mounting the harvesting units 20 thru 28 on the forward end of the frame 12 and for mounting the units vertically with respect to the frame 12. In the illustrated embodiment, harvesting units 20 and 28 define an outboard pair of harvesting units and are each mounted for movement between first and second positions. Harvesting units 22 and 26 define an inboard pair of harvesting units which are each mounted for movement between first and second positions. Harvesting unit 24 is fixedly secured between harvesting units 22 and 26.

Figure 4:
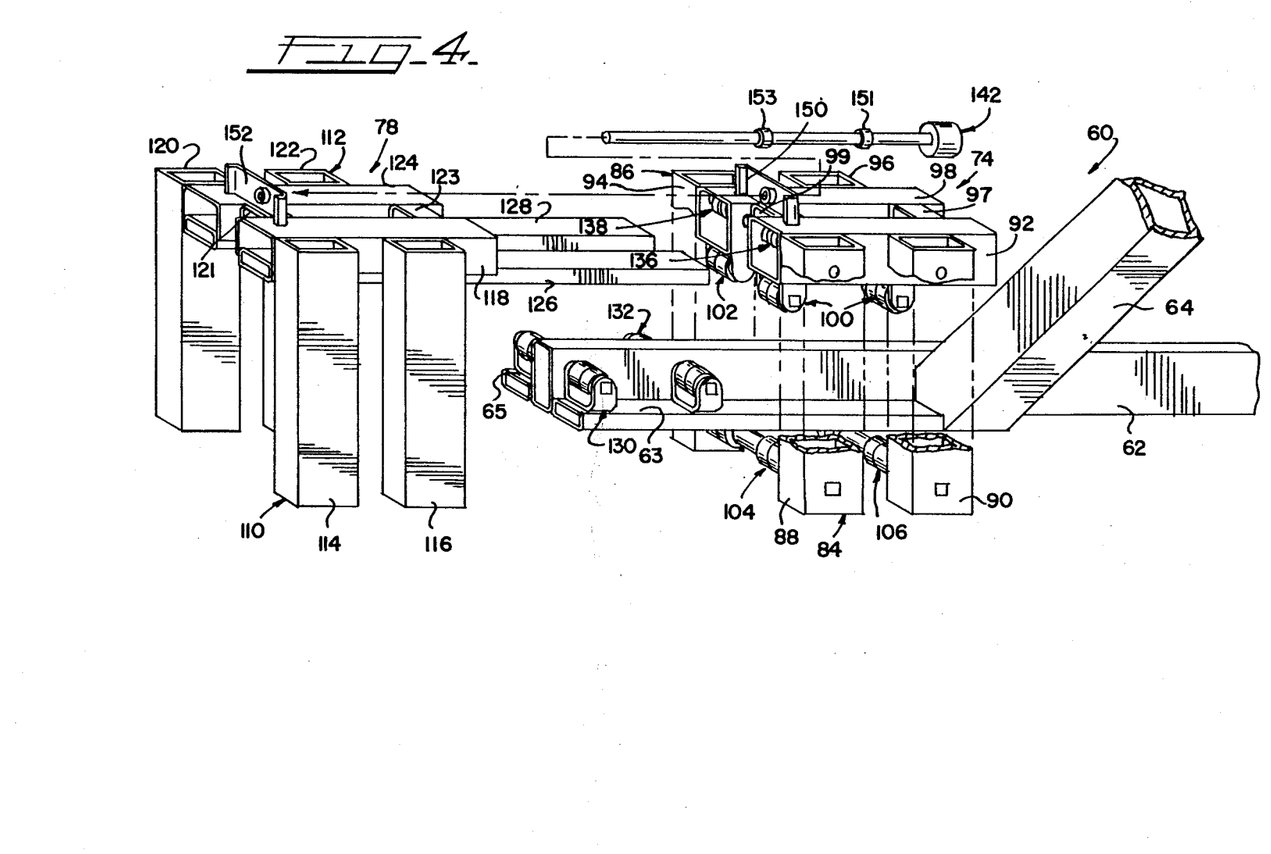
FIG. 4 is a partial perspective view of a harvesting unit mounting system according to the present invention.
Figure 5:
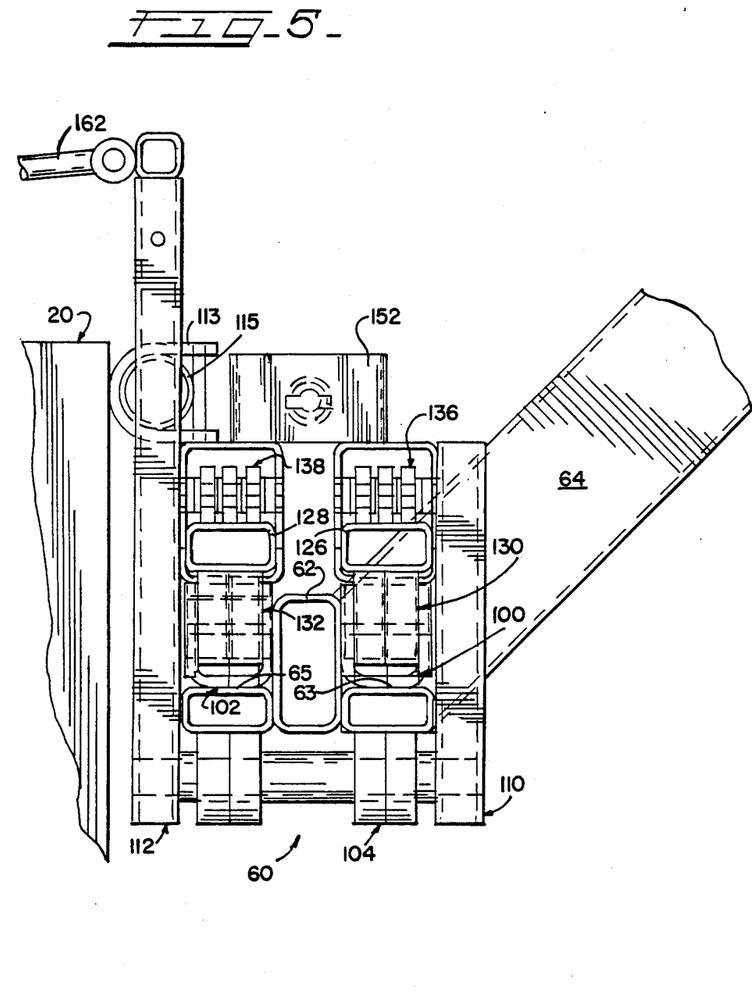
FIG. 5 is a fragmentary side elevational view of the mounting system as connected to a harvesting unit.

Turning to FIGS. 4 and 5, support assembly 60 includes an elongated tool bar 62 which defines elongated guide tracks 63 and 65. The harvesting units are individually connected to the tool bar 62 in side-by-side relation relative to each other.

As seen in FIG. 1, a pair of lift arms 64 and 66 are connected to and orthogonally extend away from the tool bar 62 rearwardly toward the frame 12 of the machine 10. The lift arms 64 and 66 are pivotally connected to the frame 12 of the machine at points 68 and 70, respectively.

Turning to FIG. 3, the angular position of lift arms 64 and 66 and, thereby, the vertical disposition of tool bar 62, with harvesting units 20 thru 28 connected thereto, is controlled by a driver 72 operatively associated with each of the lift arms. In its preferred form, each driver 72 includes a linearly distendable cylinder ram which is pivotally connected at one end to frame 12 of the machine 10 and at its other end is connected to a lift arm. The operative or effective length of drivers 72 controls the disposition of lift arm 64 and 66 and thereby the vertical disposition of the individual harvesting units 20 thru 28.

The harvesting units 20, 22, 26 and 28 are individually connected to the tool bar 62. As seen in FIG. 1, support structures 74 and 76 serve to connect the inboard pair of harvesting units 22 and 26, respectively, to the tool bar 62 just outboard of the lift arms 64 and 66. Support structures 78 and 80 serve to connect the outboard pair of harvesting units 20 and 28, respectively, to the tool bar 62. Harvesting unit 24 is fixedly secured to the tool bar 62 by a conventional saddle clamp structure 82 or other suitable device.

Since the support structures 74 and 76 for the inboard harvesting units are mirror images of each other, any description hereinafter of one support structure, and components associated therewith, will also pertain to the other support structure. Turning again to FIG. 4, in its presently preferred form, each inner support structure includes two pairs 84, 86 of spaced vertically oriented tubes or posts arranged on rearward and forward sides, respectively, of tool bar 62. (Note: Throughout this application the term "tube" is used generally referring to structural members, and such structural members need not be tubular but may be other shapes utilized as structural members.) Post members 88 and 90 of tubular pair 84 are laterally joined to each other by a hollow guide channel 92 which extends substantially parallel with the tool bar 62. Post members 94 and 96 of the other upstruck tube pair 86 are laterally joined to each other by a hollow guide channel 98. Guide channels 92 and 98 are tied or joined together in spaced relation above the guide tracks 63 and 65 of tool bar 62 by tie members 97 and 99.

Guide channel 92 has a set of roller bearings 100 fixedly secured thereto and depending therefrom. Similarly, guide channel 98 has a set of roller bearings 102 fixedly secured thereto and depending therefrom. Bearing sets 100 and 102 serve to mount both the associated inner support structure and the inner harvesting unit connected thereto on the guide tracks of tool bar 62. More specifically, bearing sets 100 and 102 allow an associated inner support structure and the individual harvesting unit connected thereto to linearly move along the axial length of tool bar 62 as by rolling along the guide tracks 63 and 65.

Bearing assemblies 104 and 106 are provided in combination with the inner support structure and, in relation to bearing sets 100 and 102, are arranged on an opposite or underside of tool bar 62 to add stability to the inner support structure. More specifically, bearing assembly 104 includes a set of roller bearings which extends between the upstruck members 88 and 94 and engage an underside of tool bar 62. Similarly, bearing assembly 106 includes a set of roller bearings which extend between upstruck members 90 and 96 and engage an underside of tool bar 62.

Support structures 78 and 80 are likewise mirror images of each other and, therefore, any description hereinafter of support structure 78 and the components associated therewith will also pertain to the other support structure 80. As illustrated in FIG. 4, each outer support structure includes two pairs 110, 112 of spaced vertically oriented tubes or posts arranged on rearward and forward sides of tool bar 62. Post members 114 and 116 of the tubular pair 110 are laterally joined to other each by a hollow guide channel 118 which extends substantially parallel with the tool bar 62. Post members 120 and 122 of tubular pair 112 are laterally joined to each other by a hollow guide channel 124 which extends substantially parallel with the tool bar 62. Guide channels 118 and 124 are tied or joined to each other in spaced relation above the guide tracks 63 and 65 of tool bar 62 by tie members 121 and 123.

To facilitate assembly and disassembly of the individual harvesting units to the frame 12 of the machine, each harvesting unit is provided with a generally C-shaped saddle 113. As illustrated in FIGS. 1, 2 and 5, saddle 113 is fixedly secured, as by welding or other means, to an upper rear portion of the housing assembly 30 of each harvesting unit. Extending laterally between and fixed to posts 94, 96 of each inner supporting structure and fixed between posts 120, 122 of each outer supporting structure is a sleeve 115 (FIG. 5). Each sleeve 115 is adapted to cooperate with saddle 113 to pivotally and individually connect each harvesting unit to the support assembly 60 and to the frame of the machine.

Returning to FIG. 4, the hollow guide channel 118 has a cantilevered arm 126 which extends parallel thereto and extends therefrom toward the adjacent inner support structure. The free end of arm 126 is received for linear movement within the hollow guide channel 92 of the adjacent inner support structure. In a similar manner, a cantilevered arm 128 extends parallel to and from guide channel 124 toward the adjacent inner support structure. The free end of arm 128 is received for linear movement within hollow guide channel 98 of the adjacent inner support structure.

In the preferred embodiment, each outer support structure, with the outer harvesting unit secured thereto, is mounted for linear movement with respect to the inner support structure and relative to the tool bar 62. To effect such ends, and as illustrated in FIGS. 4 and 5, tool bar 62 is provided with two sets of roller bearings 130 and 132 which support the cantilevered arms 126 and 128, respectively, of the outer support structure for sliding movement along the guide tracks 63 and 65.

Moreover, additional sets of roller bearings 136, 138 are received within the hollow channels 92, 98 of the adjacent inner support structure. As seen in FIG. 5, bearing sets 136, 138 act against the upper surface of cantilevered arm 126, 128, respectively, to counteract the overhang force created when the outer harvesting units are moved out to a row spacing greater than thirty inches. The weight of the harvesting unit connected to this outer supporting structure urges the cantilevered arms 126, 128 against the top of bearing sets 130 and 132. As the outer harvesting unit moves out, the cantilevered arms 126 and 128 roll over the top of bearing sets 130 and 132 and under bearing sets 136, 138, respectively. In effect, the outer support units are supported in a cantilevered fashion by the adjacent inner sliding support structures and the tool bar 62.

To facilitate positioning of the individual harvesting units on the tool bar 62, a selectively operated driver mechanism, which may be controlled by the harvester operator, is provided. In a preferred embodiment, and as seen in FIG. 1, such a driver mechanism includes two hydraulic motors or cylinders 142 and 144 extending substantially parallel to the tool bar 62 and in opposite axial directions from each other. Cylinder 142 is adapted to move each of the harvesting units 20, 22 between first and second positions. Cylinder 144 moves each of the harvesting units 26, 28 between first and second positions.

As illustrated in FIG. 1, one end of each cylinder 142 and 144 is articulately connected to tool bar 62 approximate mid-length thereof. A distendable ram or member 146 linearly extends from the opposite end of cylinder 142. Likewise, a distendable ram or member 148 linearly extends from the opposite end of cylinder 144. Ram 146 freely passes through an inner actuator channel 150 that is fixedly attached to the inner slide support structure 74. For purposes described in detail hereinafter, ram 146 is provided with stops 151 and 153 fixedly attached thereto on opposite sides of the inner actuator channel 150. The free end of ram 146 is connected to an outer actuator channel 152 which is attached to the outer support structure 78.

In a similar manner, ram 148 of cylinder 144 freely passes through inner actuating channel 154 provided on the inboard support structure 76 and is secured to an outer actuator channel 156 secured to the outer support structure 80. For purposes described in detail hereinafter, ram 148 is provided with stops 155 and 157 fixedly attached thereto on opposite sides of the inner actuator channel 154.

Although not required, it is desirable, from the point of reducing debris drawn into a harvesting unit by the rotating picker spindle, to provide for adjustment of the angular disposition of each harvesting unit relative to the ground. In this regard and again turning to FIG. 3, each harvesting unit is provided with a mechanism 160 for setting the angular position of the associated harvesting unit relative to the machine frame 12.

In its preferred form, mechanism 160 includes an upper tension link 162. One end of tension link 162 is articularly connected to an upstruck member of each supporting structure. The opposite end of 162 is adjustably secured to a forward end of the harvesting unit with which the link 162 is associated as by a jam nut 164.

When the machine is being driven from one location to another, harvesting units 20 thru 28 are preferably carried in a raised position. By distending drivers 72, lift arms 64 and 66 are caused to pivot the tool bar 62 into a raised or transport position. Because the individual harvesting units are each connected to the tool bar 62, they too are vertically raised into a transport position.

In preparation for harvesting, drivers 72 are operated to allow lift arms 64 and 66 to pivot downward. Downward movement of lift arms 64 and 66 results in the tool bar 62 and, thereby, the harvesting units carried thereon, being lowered. The ultimate vertical position of the harvesting units is controlled by adjusting the operative or effective length of drivers 72. After attaining the proper vertical disposition of tool bar 62 and the harvesting units, the lateral spacing between the individual harvesting units is set.

It is often necessary, for effecting service of the harvesting unit components, or for harvesting wider rows of cotton that the individual harvesting units be disposed more than thirty inches apart from each other. To effect wider spacing between harvesting units from that illustrated in FIG. 6, cylinders 142 and 144 of the driver mechanism are operated in a manner causing linear distention of rams 146 and 148. As rams 146, 148 are distended, the outboard harvesting units 20, 28 are moved outwardly. The outward movement of each outboard harvesting unit is supported by the adjacent inboard harvesting unit.

Figure 7:
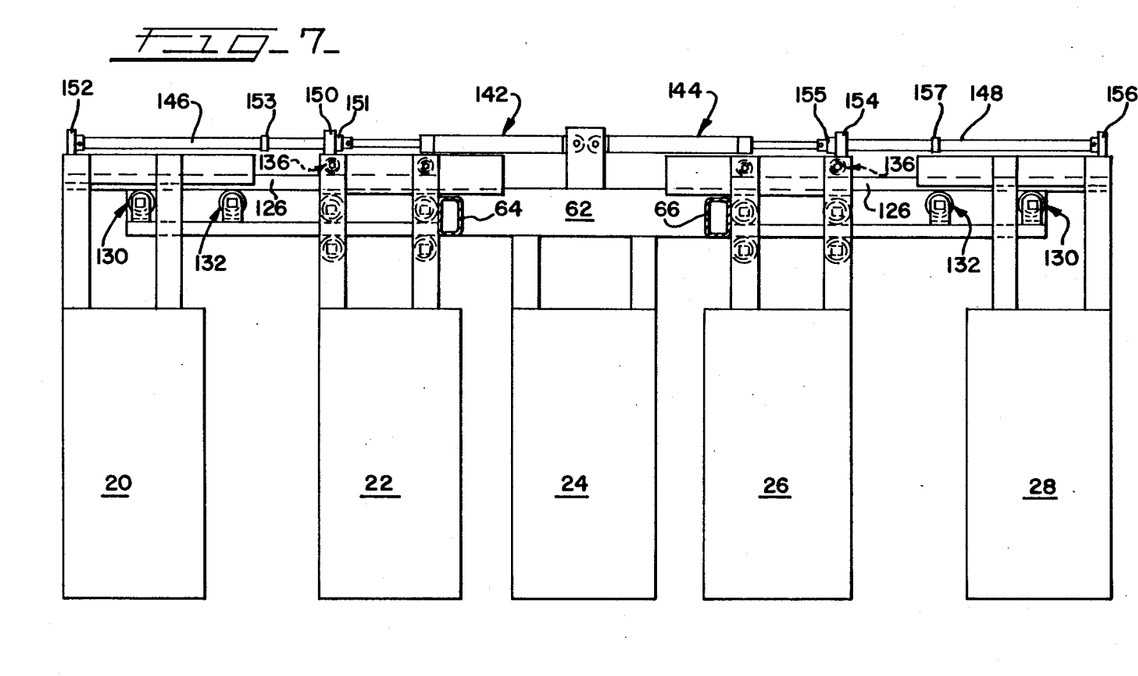
FIG. 7 is a partial rear elevational view showing an outboard pair of harvesting units outwardly spaced from an inboard pair of harvesting units.

As illustrated in FIG. 7, when an outer harvesting unit is moved away from an adjacent inner harvesting unit the cantilevered arms 126, 128 of the outboard supporting structure 78 roll over bearing sets 130, 132 and under bearing sets 136, 138 along the guide tracks defined by tool bar 62. During movement of outboard harvesting units 20 and 28, the inboard harvesting units 22 and 26 initially remain in position since rams 146, 148 of cylinders 142, 144, respectively freely pass through the inner actuator channels 150, 154.

When the outboard harvesting units 20, 28 are moved to their desired row spacing from the inboard harvesting units 22, 26 row spacing stops 151, 155 provided on rams 146, 148, respectively, will have moved against the inner actuating channels 150 and 154 of the inner support structures 74, 76, respectively.

Figure 8:
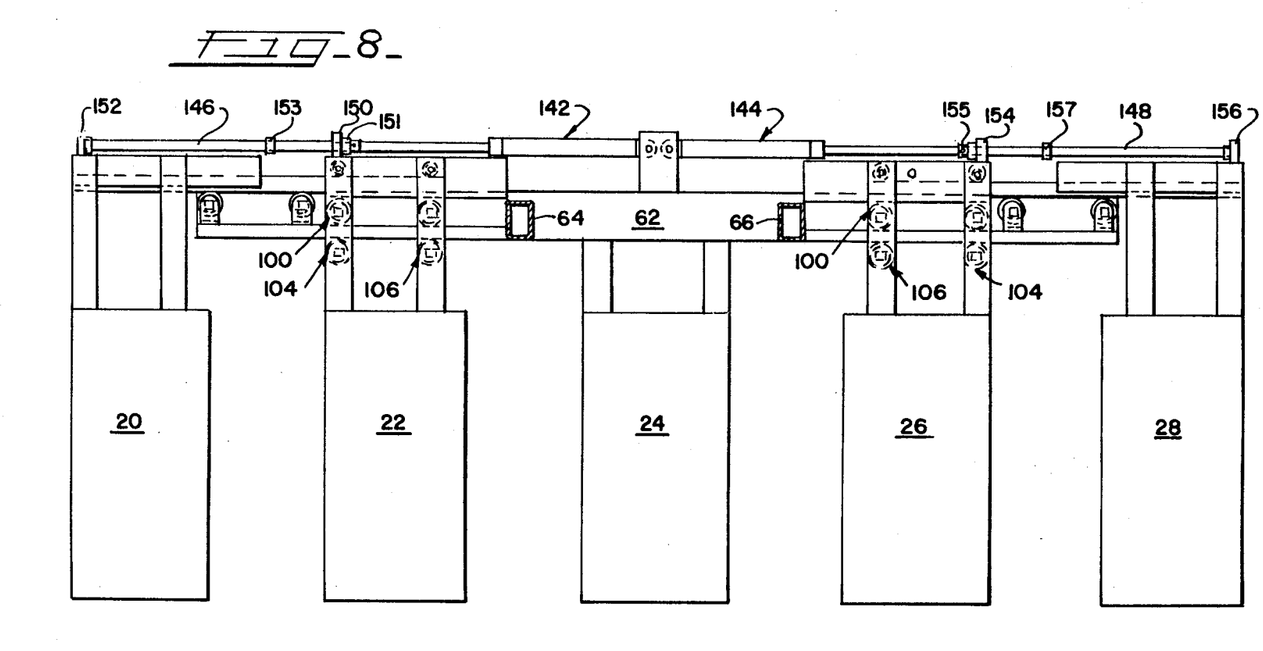
FIG. 8 is a partial rear elevational view showing all of the harvesting units in a configuration for harvesting wide row cotton.

Continued distention of the rams 146, 148 from their positions schmatically represented in FIG. 7 will cause the inboard and outboard harvesting units to conjointly move outwardly. Turning to FIG. 8, as the inboard harvesting units move outwardly, bearing sets 100, 102, 104 and 106 guide the inner supporting structures and the harvesting units connected thereto along the guide tracks of the tool bar between first and second positions. The rams 146 and 148 stop when the inboard harvesting units are at their desired row spacing from the center harvesting unit 24. All the harvesting units should now be at the desired row spacing.

Figure 6:
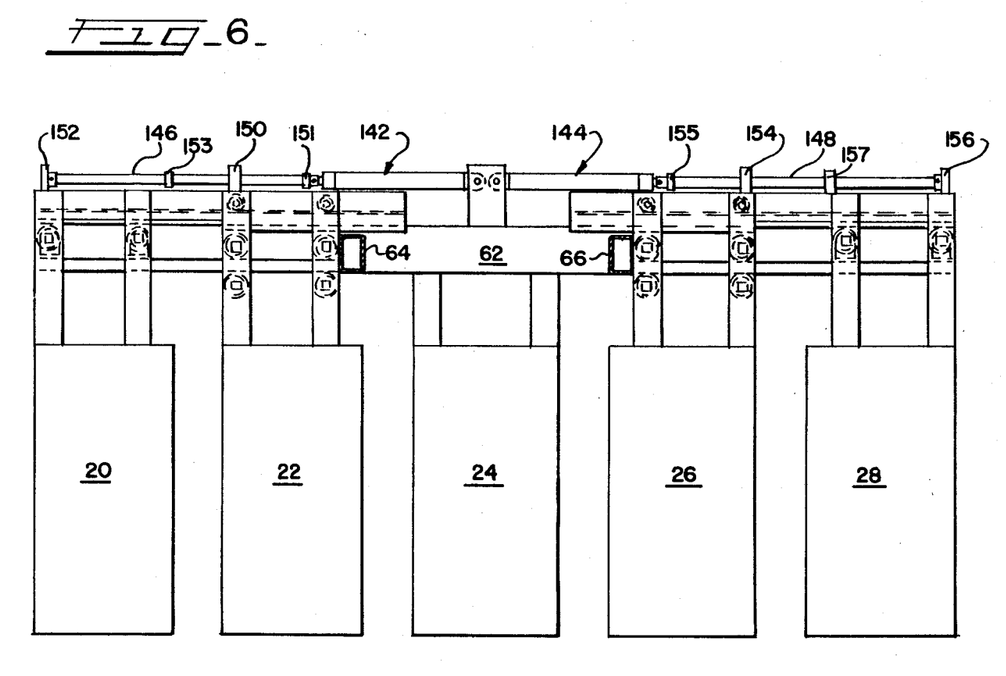
FIG. 6 is a partial rear elevational view showing the harvesting units arranged for narrow row cotton harvesting.

As illustrated in FIGS. 6, 7 and 8, stops 153 and 157 are fixedly provided on rams 146, 148, respectively, in axially spaced relation to stops 151, 155, respectively. Stops 153, 157 are provided for returning the inboard harvesting units to their narrow spacing relationship with the harvesting unit 24 upon the retraction of rams 146, 148. As should be appreciated, retraction of the harvesting units to the orientation illustrated in FIG. 6 operates in a reverse order to that described above for increasing the spacing between harvesting unit.

It should be appreciated that the method of moving the harvesting units between first and second positions can be effected through any source of linear actuation. A rack and pinion assembly could be applied to the structure to provide such movement. In such an arrangement, a rack would be mounted to the tool bar 62 and each pinion would mount to an inner or outer sliding frame. Actuation of such a rack and pinion could be effected with a manual hand crank fitted to the respective pinion to achieve the desired movement for the harvesting units. The drive arrangement described in detail above is preferred in that it provides easy control and is convenient and that it could be operated from the cab of the cotton picker unit.

To reduce the amount of debris drawn into the individual harvesting unit during operation, mechanism 160 allows the jam nut 164 to be positioned linearly along link 162 in a manner properly positioning each individual harvesting unit relative to the ground.

From the foregoing it will be observed that numerous modifications or variations can be effected without departing from the true spirit and scope of the novel concept of the present invention. It is to be understood that the present disclosure is intended as an exemplication of the invention, and is not intended to limit the invention to the specific embodiment illustrated. The disclosure is intended to cover by the appended claims all such modifications as fall within the scope of the claims.

What is claimed is:

1. A multi-row cotton harvester comprising:
    a mobile main frame;
    a plurality of cotton harvesting units including a first pair of cotton harvesting units, each harvesting unit defining a fore-and-aft plant passage and includes a first picker rotor with a rotational axis and a second picker rotor with a rotational axis;
    an elongated tool bar which is mounted on said frame and extends laterally across a forward end of the frame and rearwardly of said harvesting units, said tool bar being capable of vertical movement relative to said frame;
    means for individually connecting said plurality of harvesting units to said tool bar forwardly of the main frame in a side-by-side relationship relative to each other, each individual connecting means comprises support means arranged rearwardly of and connected to a harvesting unit such that each harvesting unit hangs forwardly from the tool bar with a predetermined attitude relative to the frame and for allowing each harvesting to be laterally moved along the tool bar with respect to the frame to facilitate access to the units, and a fore-and-aft extending tension link extending above the harvesting unit and connected to and extending forwardly from said support means for individually setting the predetermined attitude of each harvesting unit relative to the frame; and
    driver means for laterally displacing said harvesting units between said first and second laterally spaced positions.

2. A multi-row cotton harvester according to claim 1 further including a pair of lift arms pivotally attached to said main frame and connected to said tool bar, and drive means for controlling the angular displacement of said lift arm and thereby the vertical position of said harvesting units.

3. A multi-row cotton harvester according to claim 2 wherein said tool bar defines a guide track extending away from said lift arms in generally orthogonal directions.

4. A multi-row cotton harvester according to claim 3 wherein each support means of said individual connecting means includes roller means for permitting the harvesting unit connected thereto to roll along the guide track of said tool bar for linear distention between first and second positions.

5. A multi-row cotton harvester according to claim 1 wherein said plurality of cotton harvesting units further includes a pair second pair of harvesting units, means for individually connecting each harvesting unit of said second pair to said tool bar forwardly of the main frame in side-by-side relation with the other pair of harvesting units, each individual connecting means comprises support means arranged rearwardly of and connected to a harvesting unit such that each harvesting unit of said second pair hangs forwardly from the tool bar with a predetermined attitude relative to the frame and for allowing lateral displacement of each harvesting unit of said second pair of harvesting units between first and second laterally spaced positions, each individual connecting means further includes a fore-and-aft extending tension link connected to and extending forwardly from said roller support means for individually setting the predetermined attitude for each harvesting unit relative to the frame, and wherein said driver means is connected to both of said second pair of harvesting units such that each harvesting unit of said second pair of harvesting units is individually and laterally movable between first and second laterally spaced positions.

6. The multi-row cotton harvester according to claim 5 wherein each support means of said means for individually connecting each harvesting unit of said second pair to said tool bar includes roller means for permitting the harvesting unit connected thereto to linearly roll along said tool bar for distention between first and second positions.

7. A multi-row cotton harvester according to claim 1 wherein said driver means includes a linearly distendable ram connected between said tool bar and the harvesting unit it displaces.

8. A multi-row cotton harvester according to claim 7 wherein said ram has a preset stop for setting the second position for said harvesting unit.

9. A multi-row cotton harvester comprising:
    a mobile main frame;
    a plurality of cotton harvesting units including first and second cotton harvesting units, each harvesting unit defining a crop receiving opening for receiving a row of cotton; and
    means for supporting said first and second cotton harvesting units forwardly of said main frame in side-by-side relation, said supporting means comprising a tool bar extending laterally across said frame and rearwardly of said harvesting units and which is mounted on said main frame and is capable of vertical movement relative to said frame, means for individually connecting said first and second harvesting units to said tool bar, said connecting means including roller means supported on the tool bar and individually connected to an aft end of each harvesting unit and tension link means extending from said roller means and parallel to said crop receiving opening for individually regulating the tilt of each of said harvesting units, said connecting means allowing at least one of said harvesting unit to laterally move relative to said frame between first and second laterally spaced positions; and
    driver means for linearly and laterally displacing said movable harvesting unit between its first and second laterally spaced positions related to said tool bar.

10. A multi-row cotton harvester according to claim 9 wherein lift arms pivotally mount said tool bar to said main frame, each lift arm being pivotally displaced by a distendable driver whose operative length determines the vertical disposition of said harvesting units relative to said main frame.

11. A multi-row cotton harvester according to claim 9 wherein said tool bar defines substantially horizontal tracks extending in generally orthogonal directions from said lift arms.

12. A multi-row cotton harvester according to claim 9 further including another harvesting unit fixedly secured to said tool bar intermediate said first and second harvesting units and in a side-by-side relationship therewith.

13. A multi-row cotton harvester according to claim 9 wherein said driver means includes a linearly distendable member connected to said movable harvesting unit for linearly moving said harvesting unit along said tool bar between its first and second laterally spaced positions.

14. A multi-row cotton harvester according to claim 13 wherein said driver means is connected to at least one of said third and fourth harvesting units and includes at least one position stop.

15. A multi-row cotton harvester comprising:
a mobile main frame;
a pair of lift arms pivotally attached to said main frame;
an elongated tool bar mounted connected to said lift arms such that the tool bar is capable of vertical movement relative to said frame, said tool bar defining a guide track extending away from said lift arms in generally orthogonal directions; an inner pair of cotton harvesting units connected to said tool bar forwardly of the main frame in a side-by-side relationship with each other, with each of said harvesting units of said inner pair being connected to said tool bar by a sliding support structure with bearing means for permitting an associated harvesting unit to be linearly displaced between first and second laterally spaced positions by rolling along the guide track of said tool bar;
an outer pair of harvesting units operatively connected to the tool bar in a side-by-side relationship with said inner pair of harvesting units, each harvesting unit of said outer pair of harvesting units being operatively connected to said tool bar by a sliding support structure permitting linear distinction of each harvesting unit of said outer pair of harvesting units between said first and second laterally spaced positions, each sliding support structure for connecting the outer pair of harvesting units to said tool bar including a generally horizontal cantilevered arm telescopically secured and supported by said sliding supporting structure of an adjacent harvesting unit of said inner pair of harvesting units; and
driver means for displacing each said harvesting units between said first and second laterally spaced positions.

16. A multi-row cotton harvester comprising:
a mobile main frame;
first and second cotton harvesting units, said first and second cotton harvesting units each defining a crop receiving opening for receiving rows of cotton; and
means for supporting said first and second harvesting units forwardly of said main frame in side-by-side relation, said supporting means including a tool bar mounted on said main frame for vertical movement relative thereto, means for individually connecting said first and second harvesting units to said tool bar such that at least one of said harvesting units is movable between first and second laterally spaced positions; and
third and fourth cotton harvesting units arranged outwardly of and adjacent to said first and second harvesting units, said third and fourth cotton harvesting units each defining a crop receiving opening for receiving row of cotton;
means for individually connecting said third and fourth harvesting units to said tool bar for selective displacement between first and second laterally spaced positions, said third and fourth harvesting units each include a generally horizontal cantilevered arm telescopically received and supported on bearings carried by the connecting means of an adjacent harvesting unit and said tool bar.

* * * * *